3,378,073
METHOD OF FRACTURING A SUBTERRANEAN FORMATION WITH A SHEAR THICKENING LIQUID
Joseph G. Savins, Dallas, Tex., assignor to Mobil Oil Corporation, a corporation of New York
No Drawing. Filed May 10, 1966, Ser. No. 548,873
15 Claims. (Cl. 166—42)

This invention pertains to fracturing a subterranean formation penetrated by a well.

Subterranean formations are fractured for various reasons. For example, the formation around a well may be fractured to increase the permeability. Such an increase in permeability enables fluids to be produced from the subterranean formation at a greater rate with the same pressure drop.

Fracturing a subterranean formation by applying hydraulic pressure has been demonstrated to be economical and practical. Hydraulic fracturing is improved by a fracturing liquid which has the following characteristics:

(1) The fracturing liquid is capable of holding a propping material, such as sand, in suspension while being pumped down the well and into fractures which will be formed in the formation; but it also is capable of depositing the propping material in the fractures;

(2) It has a viscosity low enough to be pumped down the well, and it allows hydraulic pressure to be generated against the formation;

(3) It flows into the fractures formed in the formation and enables extending the fractures, but affords minimal loss of the fracturing liquid into the pores of the formation;

(4) It does not plug the pores of the formation or reduce the permeability of the formation permanently.

Most fracturing liquids fail in at least one of these characteristics. Usually, the fracturing liquids have a high rate of leak-off into the formation initially and when fractures expose virgin formation surfaces. Thus, a high volumetric rate of flow or prolonged flow of the fracturing liquid is required to fracture successfully the formation.

Accordingly, it is an object of the invention to provide a method of fracturing a subterranean formation which prevents a high rate of leak-off of the fracturing liquid into the formation.

It is another object of the invention to provide a method of fracturing a subterranean formation which allows controllably thickening the fracturing liquid in situ and controllably lowering the viscosity of the fracturing liquid in situ without depending on time or temperature effects upon complex additives, or on multiple injections of different fluids.

Further objects and attendant advantages of the invention will be apparent from the following detailed description.

In accordance with the invention, a subterranean formation penetrated by a well is fractured with water containing a quantity sufficient to create a shear thickening liquid composition of polyvinyl alcohol and borate ions. The water containing the polyvinyl alcohol and borate ions in sufficient quantity to exhibit shear thickening properties is referred to as the "shear thickening liquid composition" herein.

I have found that water containing polyvinyl alcohol and borate ions makes a particularly desirable shear thickening liquid composition for use in fracturing. By shear thickening, I mean that phenomenon wherein a material spontaneously changes from a readily pourable liquid to a cohesive, highly viscous mass when subjected to a critical rate of shear, sometimes referred to as rate of deformation. When the shearing is subsequently reduced below the critical rate, however, the viscous mass reverts to its original liquid state. By virtue of its shear thickening properties, the water containing polyvinyl alcohol and borate ions has particular advantages. In a fracturing operation employing the shear thickening liquid composition, when the injection pressure and, hence, also, the flow rate are increased, the critical shear rate is exceeded and the liquid composition thickens. Accordingly, there is little fluid loss into the formation. Consequently, the formation can be fractured to the desired extent with relatively lower rates of flow of fracturing liquid than have been possible heretofore. The shear thickening liquid composition readily holds any propping agent in suspension during flow because of the relatively high viscosity, particularly in the shear thickened state. Yet, even when in the shear thickened state, it will conformably flow into fractures which are opened into the subterranean formation, carrying the propping agent with it and extending the fracture to the desired extent.

After the fracture is propagated to the desired depth, the hydraulic pressure is released. Consequently, flow into the fracture stops. Thus, the rate of shear decreases below the critical rate required for shear thickening. Consequently, the shear thickening liquid composition reverts to its liquid, less viscous state. In the less viscous state, the shear thickening liquid composition deposits the propping agent in the fractures of the formation. Further, the shear thickening liquid composition may be produced from the formation at low rates of flow and, hence, low rates of shear, without shear thickening.

Whether or not a liquid composition of water containing polyvinyl alcohol and borate ions exhibits shear thickening may be determined as follows. As previously mentioned, shear thickening is demonstrated by an increase in the apparent viscosity of a liquid when subjected to an increase in shear rate within a certain range of shear rates. Both the apparent viscosity and the shear rate are readily determinable from a rotational viscometer such as a Couette-type viscometer, e.g., A Brookfield viscometer with a U.L. adapter, or a Fann viscometer. The property of shear thickening is shown by the apparent viscosity data, as illustrated in Table I, to which table further reference will be made hereinafter. As the shear rate increases, there will occur a region in which the apparent viscosity of the liquid will increase if the liquid possesses the property of shear thickening.

As the term is used herein, polyvinyl alcohol is defined as the vinyl alcohol polymer which in a 4 percent by weight aqueous solution has a viscosity of from about 3 centipoises to about 65 centipoises at 20° C. The viscosity used in defining the polymer is measured on a Brookfield LVF viscometer, using a No. 1 spindle at 60 revolutions per minute. Such a vinyl alcohol polymer has a molecular weight of from about 10,000 to about 300,000. Hereinafter, wherever reference is made to a particular polyvinyl alcohol, it will be designated by a number which refers to the viscosity in centipoises of a 4 percent solution of the polyvinyl alcohol at 20° C. For example, polyvinyl alcohol 5 designates a polyvinyl alcohol which in a 4 percent by weight aqueous solution has a viscosity of about 5 centipoises at 20° C. Polyvinyl alcohol 5 has a molecular weight of approximately 50,000.

The polyvinyl alcohol will not form a shear thickening liquid with water alone, but requires the addition of borate ions. The borate ion is furnished, for example, by an ionizing borate such as an alkali metal borate. For practical purposes, sodium borate will be the ionizing borate used as the source of the borate ion. Sodium borate, as the term is used herein, defines the compound having the formula $Na_2B_4O_7 \cdot 10H_2O$. When weight percentages of sodium borate are used, the molar equivalence of borate ions is determined with regard to this formula.

A given concentration of polyvinyl alcohol produces in aqueous solution a higher viscosity when its aqueous solution also contains a higher concentration of borate ions. Therefore, the interrelationship between the concentrations of the polyvinyl alcohol and of the borate ions must be considered in tailoring the shear thickening liquid composition to achieve the most effective fracturing in a given subterranean formation with given surface equipment.

The following guidelines, based on early work with aqueous solutions of polyvinyl alcohol and borate ions, describe liquid compositions which are known to be shear thickening and which are satisfactory for use in fracturing operations. The guidelines are intended to be illustrative only since any liquid composition containing polyvinyl alcohol and borate ions and exhibiting shear thickening behavior may be employed beneficially in fracturing operations.

The liquid composition may exhibit shear thickening behavior with a concentration as low as 1.03 percent by weight of certain high molecular weight polyvinyl alcohols, e.g., polyvinyl alcohol 65, and a high concentration of borate ions. Ordinarily, the shear thickening liquid composition should contain at least about 1.3 percent by weight of polyvinyl alcohol. In order to produce shear thickening with a concentration of about 1.3 percent, the polyvinyl alcohol should be at least polyvinyl alcohol 30. The minimum concentration of polyvinyl alcohol necessary to produce useful shear thickening increases with lower-numbered polyvinyl alcohols, for example, to about 2.9 percent by weight with polyvinyl alcohol 5.

Increasing the concentration of the polyvinyl alcohol increases the viscosity of the shear thickening liquid composition. Consequently, the maximum concentration of polyvinyl alcohol which may be employed is constrained to that which imparts a viscosity low enough to enable the shear thickening liquid composition to be pumped through the well and apply hydraulic pressure to the formation for fracturing it. Usually, a concentration of polyvinyl alcohol is employed which imparts a viscosity less than about 10 poises when measured at rates of shear below the critical rate of shear and at temperatures below the boiling point of the water. Ordinarily, this means no more than about 10 percent by weight of the polyvinyl alcohol is employed in the shear thickening liquid composition.

The shear thickening liquid composition should contain from at least about 0.016 to about 0.95 percent by weight of borate ions. The minimum amount of borate ions required is increased from about 0.016 to a higher amount as the amount of a specific polyvinyl alcohol is decreased toward the minimum amount of polyvinyl alcohol required, as described and illustrated below. Amounts of borate ions greater than about 0.95 percent by weight do not appear detrimental to the shear thickening behavior but are usually unnecessary and uneconomical. Amounts of borate ions above about 1.8 percent by weight, however, do tend to precipitate a borate salt from the shear thickening liquid composition at room temperature.

As mentioned, the particular amount of borate ions to be employed is related to the amount of and to the specific polyvinyl alcohol used. Greater amounts of borate ions are required at the lower concentrations of a specific polyvinyl alcohol than at the higher concentrations thereof. For example, at least about 0.12 percent by weight of borate ions, as supplied by about 0.29 percent by weight of sodium borate, is necessary to produce useful shear thickening in an aqueous solution containing about 1.35 percent by weight of polyvinyl alcohol 65. However, only about 0.056 percent by weight of borate ions, as supplied by about 0.14 percent by weight of sodium borate, is required to produce useful shear thickening when about 1.62 percent by weight of polyvinyl alcohol 65 is contained in the aqueous solution. And only about 0.016 percent by weight of borate ions, as supplied by about 0.04 percent by weight of sodium borate, is required when about 2.15 percent by weight of polyvinyl alcohol 65 is contained in the aqueous solution. Considering another specific polyvinyl alcohol, when the solution contains about 2.91 percent by weight of polyvinyl alcohol 5, about 0.43 percent by weight of borate ions, as supplied by about 1.06 percent by weight sodium borate, is required to produce a useful shear thickening liquid composition. With about 4.2 percent by weight polyvinyl alcohol 5 contained in the solution, only about 0.078 percent by weight borate ions, as supplied by about 0.192 percent by weight sodium borate, induces useful shear thickening. As a further illustration with still another polyvinyl alcohol, when the solution contains only about 1.33 percent by weight of polyvinyl alcohol 30, about 0.95 percent by weight borate ions, as supplied by about 2.33 percent by weight of sodium borate, is required to produce useful shear thickening. However, when the solution contains about 2.15 percent by weight of polyvinyl alcohol 30, only about 0.028 percent by weight borate ions, as supplied by about 0.07 percent by weight sodium borate, is required to produce useful shear thickening.

Typical data showing shear thickening is illustrated in Table I. The data for Table I was taken on a Fann model A37 rotational viscometer measuring the apparent viscosity at 25° C. of a solution containing 2.91 percent of polyvinyl alcohol 5 and 1.06 percent by weight of sodium borate at varying shear rates.

TABLE I

| Shear Rate (sec.$^{-1}$) | Shear Stress (dynes/cm.$^2$) | Apparent Viscosity (poise) |
| --- | --- | --- |
| 6.31 | 10 | 1.58 |
| 20.2 | 20 | 0.98 |
| 41.0 | 32.5 | 0.79 |
| 66.6 | 60 | 0.90 |
| 86.8 | 90 | 1.03 |
| 96.6 | 125 | 1.29 |
| 109 | 175 | 1.60 |
| 118 | 235 | 1.98 |
| 131 | 325 | 2.47 |
| 137 | 385 | 2.80 |
| 155 | 625, 500 | 4.02, 3.21 |
| 175 | 915 | 5.21 |
| 189 | 1100, 1085, 1025 | 5.81, 5.73, 5.41 |
| 213 | 1125, 1175 | 5.26, 5.50 |
| 234 | 1400, 1450, 1500 | 5.96, 6.17, 6.39 |
| 234 | >1500 | >6.4 |

In the practice of the invention, the shear thickening liquid composition is passed into the well and against the surface of the subterranean formation. If desired, a propping agent may be added to the shear thickening liquid composition before it is passed into the well. The amount of the shear thickening liquid composition to be employed will depend upon the volume of the well and the volume of the fractures to be formed in the subterranean formation. There will be little loss of the shear thickening liquid composition into the formation pores. It is possible to effect small fracturing jobs with as small a volume as 5,000 gallons, or less, of fracturing liquid. Of this amount of fracturing liquid, the entire amount may be comprised of the shear thickening liquid composition. On the other hand, only the bottom portion of the fracturing liquid may be comprised of the shear thickening liquid composition. For example, the bottom 50 percent of the fracturing liquid may be the shear thickening liquid composition. Other large and extensive fracturing jobs may require as much as 200,000 gallons, or more, of fracturing liquids. Even in these large, extensive fracturing operations, it will rarely require more than 100,000 gallons of the shear thickening liquid composition.

Once emplaced in the well adjacent the subterranean formation to be fractured, the high pressure pump at the surface continues to apply hydraulic pressure, increasing the hydraulic pressure on the subterranean formation up to the pressure at which the formation fractures. Continued pressure propagates the fracture to the desired distance from the well. The shear thickening liquid composition remains in its thickened, viscous mass as long as it is subjected to the high shear rates. When fracturing is completed, the pressure is reduced at the wellhead. Thus, the liquid composition is returned to its less viscous liquid state and is produced slowly from the fractures and from the well, leaving any propping agent behind.

Conventional fracturing equipment is employed in the method of the invention. Routine fracturing may be performed by flowing the fracturing liquid through the casing, through perforations therein, and against the subterranean formation. Where the pressure required to fracture the subterranean formation is in excess of the pressures the casing will withstand, special fracturing tubing is employed. When desirable, the formation may be isolated with pack-off means. Particularly when fracturing tubing is employed, the formation is isolated such that only the subterranean formation is subjected to the high fracturing pressures.

Having thus described my invention, it will be understood that such description has been given by way of illustration and example and not by way of limitation, reference for the latter purpose being had to the appended claims.

What is claimed is:

1. In a method of fracturing a subterranean formation about a well penetrating thereinto by pumping a fracturing liquid composition through said well to apply hydraulic pressure to said formation, the improvement comprising employing a liquid composition comprising (a) water, (b) polyvinyl alcohol having a molecular weight such that a 4 percent by weight aqueous solution has a viscosity at 20° C. of from about 3 to about 65 centipoises, and (c) borate ions, the particular amount of polyvinyl alcohol and the particular amount of borate ions being selected such that said liquid composition possesses shear thickening properties.

2. The method of claim 1 wherein said polyvinyl alcohol has a molecular weight such that a 4 percent by weight aqueous solution has a viscosity at 20° C. of from about 5 to about 65 centipoises.

3. The method of claim 1 wherein an alkali metal borate is added to said solution as a source of said borate ions.

4. The method of claim 1 wherein said polyvinyl alcohol is in a concentration at least as great as about 1.03 percent by weight of said liquid composition, and said borate ions are in a concentration at least as great as about 0.016 percent by weight of said liquid composition, and wherein said liquid composition has a viscosity low enough to enable it to be pumped through said well and apply hydraulic pressure to said formation for fracturing.

5. The method of claim 4 wherein said concentration of said polyvinyl alcohol is less than about 10 percent by weight and said concentration of said borate ions is less than about 1.8 percent by weight.

6. The method of claim 4 wherein said polyvinyl alcohol and said borate ions are present in said liquid composition in a minimum amount as follows:

| Type of Polyvinyl Alcohol—Viscosity of a 4 percent by weight solution at 20° C. | Amount of Polyvinyl Alcohol—weight percent of said liquid composition | Amount of Borate Ions—Weight percent of said liquid composition |
|---|---|---|
| 5 | 2.9 | 0.43 |
| 30 | 1.3 | 0.95 |
| 65 | 1.3 | 0.12 |
| 65 | 2.15 | 0.016 | and wherein the particular amount of said polyvinyl alcohol is at least as great as said weight percent of said liquid composition of said polyvinyl alcohol, and wherein the particular amount of borate ions is at least as great as about 0.016 percent by weight of said liquid composition when more than said weight percent of said polyvinyl alcohol is used, and is at least as great as said weight percent of said liquid composition of said borate ions when said weight percent of said liquid composition of said polyvinyl alcohol is used.

7. The method of claim 1 wherein said liquid composition contains at least about 2.9 percent by weight of a polyvinyl alcohol which in a 4 percent by weight aqueous solution has a viscosity of approximately 5 centipoises at 20° C. and a sufficient quantity of sodium borate to induce the property of shear thickening.

8. The method of claim 6 wherein said liquid composition contains about 2.91 percent by weight of said polyvinyl alcohol and about 1.06 percent by weight of said sodium borate.

9. The method of claim 6 wherein said liquid composition contains about 4.2 percent by weight of said polyvinyl alcohol and about 0.192 percent by weight of said sodium borate.

10. The method of claim 1 wherein said liquid composition contains at least about 1.3 percent by weight of a polyvinyl alcohol which in a 4 percent by weight aqueous solution has a viscosity of at least about 30 centipoises at 20° C. and a sufficient quantity of sodium borate to induce the property of shear thickening.

11. The method of claim 10 wherein said liquid composition contains about 1.33 percent by weight of said polyvinyl alcohol and about 2.33 percent by weight of said sodium borate.

12. The method of claim 10 wherein said liquid composition contains about 2.15 percent by weight of said polyvinyl alcohol and about 0.07 percent by weight of said sodium borate.

13. The method of claim 10 wherein said liquid composition contains at least about 1.35 percent by weight of a polyvinyl alcohol which in a 4 percent by weight aqueous solution has a viscosity of about 65 centipoises at 20° C. and about 0.29 percent by weight sodium borate.

14. The method of claim 13 wherein said liquid composition contains about 2.15 percent by weight of said polyvinyl alcohol and about 0.04 percent by weight of said sodium borate.

15. The method of claim 13 wherein said liquid composition contains about 1.62 percent by weight of said polyvinyl alcohol and about 0.14 percent by weight of said sodium borate.

References Cited
UNITED STATES PATENTS

| | | | |
|---|---|---|---|
| 3,024,191 | 3/1962 | Jones | 166—42.1 X |
| 3,096,284 | 7/1963 | Slate | 166—42.1 X |
| 3,116,791 | 1/1964 | Sandiford | 166—9 |
| 3,207,693 | 9/1965 | Morway | 166—42.1 X |

JAMES A. LEPPINK, *Primary Examiner.*